US011556384B2

(12) United States Patent
Henry et al.

(10) Patent No.: US 11,556,384 B2
(45) Date of Patent: Jan. 17, 2023

(54) DYNAMIC ALLOCATION AND RE-ALLOCATION OF LEARNING MODEL COMPUTING RESOURCES

(71) Applicant: Cisco Technology, Inc., San Jose, CA (US)

(72) Inventors: Jerome Henry, Pittsboro, NC (US); Robert Edgar Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 391 days.

(21) Appl. No.: 16/818,955

(22) Filed: Mar. 13, 2020

(65) Prior Publication Data

US 2021/0286650 A1  Sep. 16, 2021

(51) Int. Cl.
G06F 9/46 (2006.01)
G06F 9/50 (2006.01)
G06N 20/00 (2019.01)

(52) U.S. Cl.
CPC .......... *G06F 9/5011* (2013.01); *G06N 20/00* (2019.01); *G06F 2209/501* (2013.01)

(58) Field of Classification Search
CPC .. G06F 9/5011; G06F 2209/501; G06N 20/00
See application file for complete search history.

(56) References Cited

U.S. PATENT DOCUMENTS

| 10,339,447 | B2 | 7/2019 | Talathi et al. |
| 2016/0328644 | A1 | 11/2016 | Lin et al. |
| 2018/0300171 | A1 | 10/2018 | Qiao et al. |
| 2019/0042884 | A1 | 2/2019 | Guim Bernat et al. |
| 2019/0258964 | A1* | 8/2019 | Dube ............... G06N 20/00 |
| 2019/0286981 | A1 | 9/2019 | Ahmed | |

FOREIGN PATENT DOCUMENTS

| CN | 105512723 | 4/2016 |
| CN | 105787500 A | 7/2016 |

OTHER PUBLICATIONS

Biewald, "Monitor and Improve GPU Usage for Training Deep Learning Models," retrieved from <https://towardsdatascience.com/measuring-actual-gpu-usage-for-deep-learning-training-e2bf3654bcfd> Mar. 27, 2019, 6 pages.
The PCT Search Report and Written Opinion dated May 28, 2021 for PCT application No. PCT/US21/22210, 14 pages.

\* cited by examiner

*Primary Examiner* — Wissam Rashid
(74) *Attorney, Agent, or Firm* — Lee & Hayes, P.C.

(57) ABSTRACT

This disclosure describes techniques for improving allocation of computing resources to computation of machine learning tasks, including on massive computing systems hosting machine learning models. A method includes a computing system, based on a computational metric trend and/or a predicted computational metric of a past task model, allocating a computing resource for computing of a machine learning task by a current task model prior to runtime of the current task model; computing the machine learning task by executing a copy of the current task model; quantifying a computational metric of the copy of the current task model; determining a computational metric trend based on the computational metric; deriving a predicted computational metric of the copy of the current task model based on the computational metric; and, based on the computational metric trend, changing allocation of a computing resource for computing of the machine learning task by the current task model.

20 Claims, 6 Drawing Sheets

DYNAMIC ALLOCATION AND RE-ALLOCATION OF LEARNING MODEL COMPUTING RESOURCES

TECHNICAL FIELD

The present disclosure relates generally to dynamic monitoring of neural network computing and allocation of computing resources in accordance.

BACKGROUND

Current machine learning models incur extensive computational overhead in the process of being executed by one or more processors to compute one or more machine learning tasks, such as training of the machine learning model or computing one or more datasets. Increasingly, computing resources at scales commonly required for machine learning task computation may be hosted at massive computing systems such as data centers, cloud computing systems, or combinations thereof. Massive computing systems may aggregate many distributed computing nodes which host physical or virtual processors, such as Central Processing Units ("CPUs"), or accelerators such as Graphical Processing Units ("GPUs").

Physical or virtual processors may include any number of cores, and extensive computing tasks such as machine learning tasks may be computed by multiple cores of multiple processors across multiple nodes, as well as multiple clusters. Moreover, many copies of a model may be distributed across the computing nodes for scaled concurrent processing of the same task at different copies. Due to magnitudes of computational loads typically incurred by machine learning tasks, the hosting and provision of such computing resources accessible remotely by massive computing systems are important services for most modern industries, as machine learning increasingly becomes a backbone of business decisions, intelligence, and research.

While it is desirable for the availability of hosted computing resources to be scalable to the individualized computing needs of customers, in practice, the actual scale of those computing needs is often not readily ascertained in advance. Most users of hosted computing resources are not necessarily persons skilled in the art of machine learning or implementation of machine learning models, and thus may not be equipped to determine, in advance of executing the computational tasks, a scale of computing resources required. Even for those skilled in the art, the behavior of machine learning models during training and computation may be unexpected, due to the complexity of many-layered artificial neural network ("ANN") models commonly implemented today.

Consequently, there is a need to better allocate computing resources for massive computing tasks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
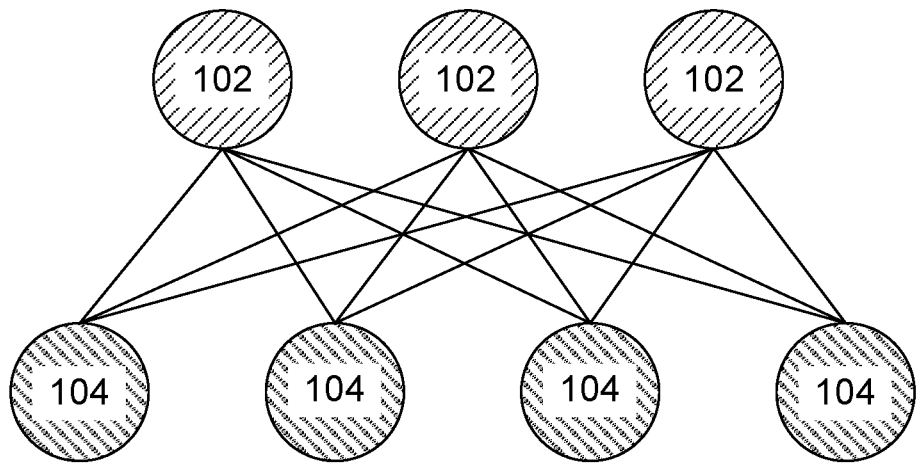
FIG. 1A illustrates an example of densely interconnected adjacent layers of a copy of a machine learning task model.

This disclosure describes techniques for improving allocation of computing resources to computation of machine learning tasks, including on massive computing systems hosting machine learning models. A method includes a computing system, based on at least one of a computational metric trend and a predicted computational metric of a past task model, allocating a computing resource for computing of a machine learning task by a current task model prior to runtime of the current task model. The method further includes the computing system computing the machine learning task by executing a copy of the current task model. The method further includes the computing system quantifying a computational metric of the copy of the current task model during runtime of the copy of the current task model. The method further includes the computing system determining a computational metric trend based on the computational metric. The method further includes the computing system deriving a predicted computational metric of the copy of the current task model based on the computational metric. The method further includes the computing system, based on the computational metric trend, changing allocation of a computing resource for computing of the machine learning task by the current task model during runtime of the copy of the current task model.

Additionally, the techniques described herein may be performed by a system having non-transitory computer-readable media storing computer-executable instructions that, when executed by one or more processors, performs the methods described above.

Additionally, the techniques described herein may be performed by a massive computing system which includes any number of nodes and/or edge nodes hosting physical or virtual systems as described above, where steps of the methods described above may be distributed among the nodes and/or edge nodes for performance.

Example Embodiments

Machine learning models such as artificial neural network ("ANN") models are commonly composed of units, such as neurons, which are interconnected in layers. Layered models may be interconnected by structures such as, for example, fully-connected structures, feedforward structures, back-propagation structures, feedback loops, and any combination thereof within and between models and combinations thereof. Units of models may each constitute computer-readable instructions stored on a computer-readable storage medium, each of which may be executed by a processor to cause the processor to perform a particular computation specified by the unit (such as solving an equation). A model may be implemented by a distributed computing framework which implements threading, concurrency, and asynchronous computing, such as TensorFlow and the like.

A model may include predetermined architecture and may include trained architecture. Predetermined architecture may include, for example, a variable of an equation of a unit of a model which is set by human operators or researchers to control equations to be solved by each unit of a model. Other predetermined architecture may include, for example, run-time settings of a unit such as learning rate or number of epochs. A learning rate may be a numerical value which controls rates at which parameters of the model are updated during training of the model. A number of epochs may be a numerical value which determines a number of times which a training dataset is computed by the model in full. In general, these may be referred to as "hyperparameters," to distinguish them from other parameters as shall be described subsequently.

Trained architecture may include, for example, a variable of an equation of a unit of a model which is not set by human operators or researchers but set by updating the value of the variable during training the model by computing a labeled training dataset. These variables may be referred to as "parameters" (as distinguished from "hyperparameters") or "weights" throughout the present disclosure.

A massive computing system executing a model during computation of machine learning tasks (which hereafter may be referred to as a "task model," for clarity), such as training, may be configured to allocate some quantity of various computing resources to the computation thereof. For example, computation of a task may be allocated some number of processor cores. Allocated cores may or may not be cores of a same physical processor, and may furthermore be physical or virtual cores of any number of physical or virtual processors of a massive computing system. Cores may be allocated by a number of physical or virtual nodes of the massive computing system, a number of physical or virtual nodes, as well as a number of physical or virtual clusters of those physical or virtual nodes. Cores may be each connected to one or more common data buses, which may transport data among cores, storage, and other elements of the computing system. The data bus may be, for example, a Peripheral Component Interconnect Express ("PCIe") connection, and the like.

The allocation of computing resources to computing tasks may be performed by the computing system sending an instruction according to an application programming interface ("API"). According to example embodiments of the present disclosure, an API may define protocols by which a computing system may group computing resources and allocate those computing resources to computing one or more machine learning tasks, which may be defined by the API as threads, contexts, processes, and the like for the purpose of multitasking, concurrent processing, context switching, scheduling, and such functions of an operating system of the computing system.

For example, according to example embodiments of the present disclosure, an API may be the Compute Unified Device Architecture ("CUDA") interface from NVIDIA CORPORATION of Santa Clara, Calif. CUDA may provide an API to configure any numbers of cores, nodes and cores therein, and/or clusters and cores and nodes therein to be integrated with computing resource management components of the computing system, to enable the computing system to monitor computing resource usage, and the like. Thus, the computing system may be able to specify computing resources such as cores which have been initialized and configured by an API element such as CUDA_VISIBLE_DEVICES. A distributed computing framework as described above may have an API which is compatible with an API for allocating computing resources to assign threads, processes, and the like to particular cores.

Moreover, a massive computing system executing a task model during computation of machine learning tasks may be configured to allocate storage space on computer-readable storage media (as shall be defined subsequently in the present disclosure) to store additional copies of the task model for computation thereof. Allocated storage space may be physical or virtual storage of any number of physical or virtual nodes of a massive computing system. Space may be allocated by a number of copies of the task model to be stored for execution.

The training of machine learning models is generally computationally intensive and large-scale, and so consequences of under-allocating computing resources and over-allocating computing resources, both in terms of computing cores and in terms of storage space, may both be undesirable. Due to the large scale of machine learning model computations, processing the computations with insufficient computing resources may result in computations being bottlenecked by the limited computing resources, and computing time becoming extenuatingly protracted (such computing time being extended by weeks or months). Moreover, due to the large scale of resource allocation in massive computing systems (wherein allocation may be in units of clusters of nodes, for example), the effects of over-allocation may become systemically compounded over multiple users or multiple tasks, leading to allocated computing resources becoming idle at large scale and depriving other users and other tasks of the benefit of the idle resources.

To some extent, computational overhead of a machine learning model may be estimated to some extent prior to allocation of resources to copies of the model, but estimation of computational workload and computational overhead, especially based on ex ante knowledge regarding the model architecture, is likely to lack precision. For example, ex ante knowledge regarding the model may include knowledge of the size of the model, which may be measured in units, layers, interconnections, and other such quantifiable characteristics of the model. In theory, it may be assumed that computational workload and overhead increase with the number of units, the number of layers, the number of interconnections, and other such quantifiable aspects of the architecture scale. Thus, naively, allocation of resources may be proportional to scale of the model architecture.

However, in practice, architectural scale may not directly correlate to computational workload and overhead of computations using copies of the model, due to differences between the pre-training model and the trained model that are learned through training copies of the model using a labeled training dataset. Training generally refers to an iterative process wherein, during each epoch, a labeled training dataset is looped through a model (or a copy thereof), which, based on features of the training dataset, computes an outcome such as a classification, a label, and the like and learns values of a weight set (i.e., parameters of the model). A cost function is defined based on the computed outcome to maximize costs of erroneous outcomes which deviate from a correct outcome, in accordance with the labeled training dataset. By an optimization algorithm such as gradient algorithms and the like, the cost function may be solved iteratively in each epoch based on each iteration of the training of a copy of the model, feeding the learned weight set back into the copy of the model for the next iteration of the training until the learned weights converge on a set of values (that is, a latest iteration of the learned weights is not significantly different in value from the previous iteration).

A learned weight set of a copy of a model may include learned parameters for each unit of the model. The learned parameters may correspond to interconnections between different units of the model, wherein a variable output from a computation at a first unit may be weighted by a learned parameter and forwarded to a second unit as a variable for a computation at the second unit. The learned parameters may be recorded as coefficients of one or more matrices, each of which represents a possible interconnection between each unit of the model. A coefficient (i.e., a learned parameter) having a nonzero value may represent an interconnection between two units of the model. A coefficient (i.e., a learned parameter) having a zero value may represent two units of the model having no interconnection therein (that is, an output from one unit is weighted to zero at an interconnection with the other unit, and thus does not factor into a computation of the other unit).

Interconnections between units of a copy of a model may be varying degrees of dense or sparse. In a model, denser interconnections may be reflected by coefficients (i.e., learned parameters) mostly having nonzero values, causing outputs of most units to be weighted to nonzero at most interconnections with other units and thus factoring into computations of those other units. In a model, sparser interconnections may be reflected by coefficients (i.e., learned parameters) mostly having zero values, causing outputs of most units to be weighted to zero at most interconnections with other units and thus not factoring into computations of those other units. Thus, adjacent layers of a copy of a model may be described using by-degree descriptions, such as sparsely interconnected, densely interconnected, or fully interconnected.

Figure 1B:
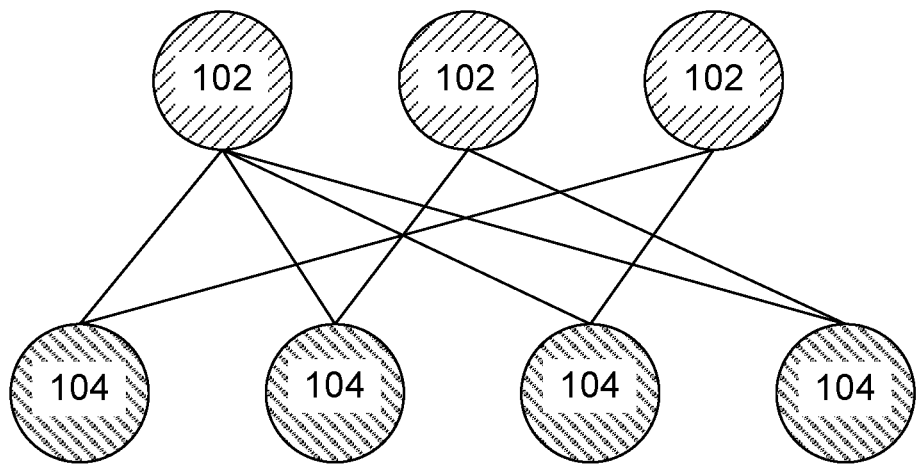
FIG. 1B illustrates an example of sparsely interconnected adjacent layers of a copy of a machine learning task model.

FIG. 1A illustrates an example of densely interconnected adjacent layers of a copy of a machine learning task model. FIG. 1B illustrates an example of sparsely interconnected adjacent layers of a copy of a machine learning task model. Herein, units of a first layer are denoted as 102, and units of a second layer are denoted as 104.

Persons skilled in the field of machine learning will appreciate that high degrees of interconnectivity of a machine learning model tend to be undesirable for accomplishing a variety of objectives. For example, in the event that a model is highly interconnected or dense, this may tend to indicate that the model is over-fitted, meaning that the model has high accuracy rates in computing the training dataset, but at the same time has suboptimal or failing accuracy rates in computing other datasets. Thus, it may be desired to enforce sparsity in a trained copy of a model by, for example, pruning interconnections in the model during or after training, or by imposition of various rules over model architecture to induce training of sparse interconnections.

Additionally, without regard to whether a copy of a model is highly interconnected, substantial numbers of units of a model as predetermined prior to training may fail to contribute significantly to computations performed by executing a trained copy of the model. For example, a common outcome of model training is that certain units may ultimately under-contribute to outputs of the trained model (even without having their respective outputs weighted to zero). However, under-contribution of particular units or paths of units may be observed generally only after training has completed, and thus such observation cannot be used as a basis for allocation of computing resources. Furthermore, training may effectively halt prematurely by the vanishing gradient phenomenon, wherein an optimizing algorithm such as a gradient algorithm cannot further adjust weights through subsequent iterations of model training due to reaching a local minimum. Thus, it may be desired to utilize regularization processes such as dropout on a trained copy of a model to, for example, eliminate units from the model after at least some number of iterations of model training (after which training may resume or restart based on the regularized copy of the model).

These, and other, techniques as known to persons skilled in the art may cause the number of units, the number of layers, and other such predetermined architecture of a model to be inaccurate predictors of computation workload and overhead of a copy of the model post-training, since predetermined architecture of the model may differ significantly from the trained copy of the model, especially upon enforcement of sparsity, application of dropout, and other such techniques. For example, trained models having sparsity enforced may be less likely than dense trained models to prematurely descend to a convergence rate of 0 at a local minimum, and thus it is more likely that only a limited subset of the units of the trained copy of the model will be engaged computationally intensively as computations proceed. An allocation of computing resources based on predetermined architecture of the model may, thus, become outdated and inefficient, either from over-allocation or under-allocation of computing resources.

Figure 2:
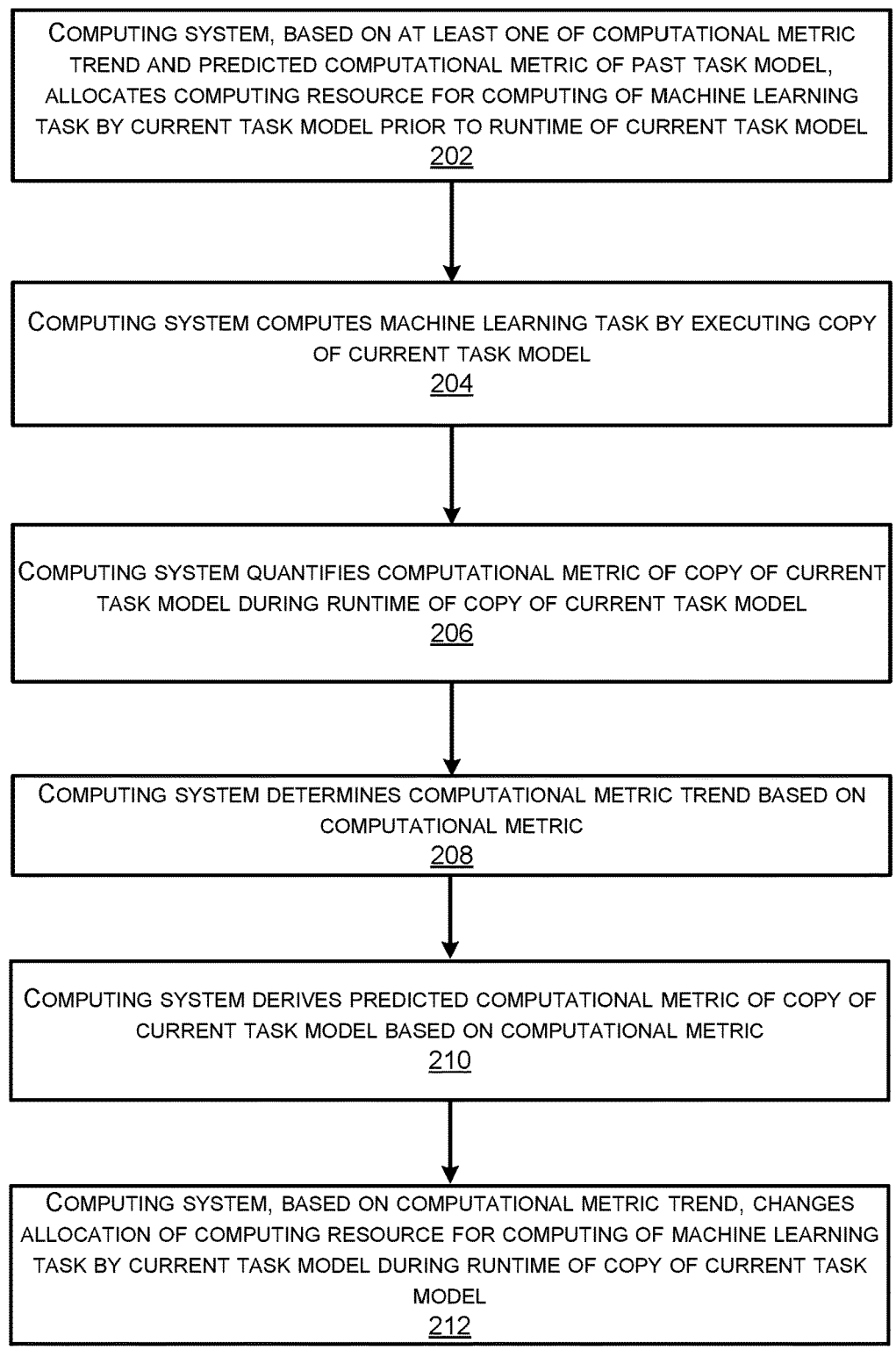
FIG. 2 illustrates a computing resource allocation method according to example embodiments of the present disclosure.

Example embodiments of the present disclosure provide methods to dynamically allocate and re-allocate computing resources for copies of task models running on a massive computing system. FIG. 2 illustrates a computing resource allocation method 200 according to example embodiments of the present disclosure.

At step 202, a computing system, based on at least one of a computational metric trend and a predicted computational metric of a past task model, allocates a computing resource for computing of a machine learning task by a current task model prior to runtime of the current task model.

According to example embodiments of the present disclosure, any number of computational metric trends and predicted computational metrics may be learned from previous iterations of the computing resource allocation method 200 performed on other task models computing other machine learning tasks, in a similar manner as described below. Based on such computational metric trends and predicted computational metrics, which may include, for example, sparsity over time and learning slope over time as described below, expected completion time of a machine learning task previously computed by past task models having respective particular predetermined architectures as described below, or expected distributions of computing workload and overhead between each copy of past task models having respective particular predetermined architectures as described below, the computing system may compare predetermined architectures of various past task models to a predetermined architecture of the current task model. Based on computational metric trends and predicted computational metrics of any past task models having similar predetermined architectures to that of the current task model, the computing system may allocate computing resources to the current task model.

For example, in the case that the current task model has a similar predetermined architecture to a past task model which trended towards sparsity over time, the computing system may allocate computing resources to the current task model with the expectation that allocations will be decreased over time. The expectation that allocations will be decreased over time may mean that, for example, cores, nodes, and/or clusters allocated to the current task model may not be reserved for a long-term basis. Thus, other components of the computing system pertaining to computing resource assignment, such as a scheduler or a load balancer, may reference the expectation that allocations will be decreased over time in assigning computing resources to other computing tasks.

In the case that the current task model has a similar predetermined architecture to a past task model which did not trend towards sparsity over time (or even trended towards density over time), the computing system may allocate computing resources to the current task model with the expectation that allocations will be reserved over time. Thus, other components of the computing system pertaining to computing resource assignment, such as a scheduler or a load balancer, may reference the expectation that allocations will be reserved over a long-term basis in assigning computing resources to other computing tasks.

At step 204, the computing system computes the machine learning task by executing a copy of the current task model. The computing system may be, for example, a massive computing system as described above.

At step 206, the computing system quantifies a computational metric of the copy of the current task model during runtime of the copy of the current task model. According to example embodiments of the present disclosure, one or more computational metrics of the copy of the current task model during computing of a machine learning task by processors of a massive computing system executing the copy of the current task model may be quantified at periodic intervals.

At step 208, the computing system determines a computational metric trend based on the computational metric. Trends may be observed in the computational metrics over time, and, based thereon, processors of the massive computing system may be allocated to computing the machine learning task or allocated away from computing the machine learning task.

According to example embodiments of the present disclosure, a computational metric of a copy of a current task model may be an inter-layer sparsity measure. Sparsity may be a comparative measure taken between adjacent layers of a current task model successively, starting from an output layer of the current task model. At each layer of the current task model, a sparsity measure may be determined by comparing a number of nonzero weighted inputs received by units of the current layer in proportion to a number of forward-feeding units in the preceding layer of the current task model. Regardless of how units of the preceding layer are interconnected with units of the current layer, weighting of the inputs may cause some of the interconnections to fail to contribute to computations of the current layer. Thus, for example, if weighted inputs received at a current layer are few in number in proportion to forward-feeding units at a preceding layer, a high sparsity (that is, low interconnectedness) may be measured between the current layer and the preceding layer.

According to example embodiments of the present disclosure, inter-layer sparsity measures of a copy of a current task model may further be aggregated by various operations to determine an overall sparsity measure of the copy of the current task model. Aggregation operations may be, for example, sum operations over inter-layer sparsity measures of a current task model, product operations over inter-layer sparsity measures of a current task model, or average operations over inter-layer sparsity measures of a current task model. Normalization may be performed on each aggregated inter-layer sparsity measure of a current task model so as to standardize influence of inter-layer sparsity measures between each pair of adjacent layers. Aggregation operations may be, for example, matrix operations over inter-layer sparsity measures of a current task model wherein sparsity measures may be aggregated as coefficients of a matrix. Regularization may be performed on such an aggregated matrix so as to standardize influence of inter-layer sparsity measures between each pair of adjacent layers.

According to example embodiments of the present disclosure, it is expected that individual interconnections of overall sparser copies of a current task model are more likely to be weighted higher than individual interconnections of overall denser copies of the current task model. Higher-weighted interconnections which are fewer in number are expected to be more intensive in computational workload and overhead than lower-weighted interconnections which are greater in number, since higher-weighted interconnections may cause variables passed over those interconnections to be larger in magnitude, and higher-weighted interconnections across multiple pairs of layers in a current task model may compound this magnifying effect. Copies of a current task model wherein sparse interconnections are up-weighted to yield variables large in magnitude may accordingly remain computationally engaged for longer than for copies of the same current task model wherein dense interconnections are not similarly up-weighted, whereas those copies of the current task model having dense interconnections may become prematurely halted due to shortcomings as described above. Thus, even though it may be expected that densely interconnected task models may have more intensive computational workloads and overhead overall than sparsely interconnected task models, copies of a current task model which are sparsely interconnected may conversely be expected to occupy computing resources for longer than copies of a current task model which are densely interconnected.

Thus, according to example embodiments of the present disclosure, a computational metric trend may be a determination that some copies of a current task model executed to compute a machine learning task trends towards sparsity over time. This may suggest that allocations of computing resources to copies of the current task model may be decreased over time for those copies that trend towards dense interconnections over time (but not greatly decreased, on account of those copies that trend towards sparse interconnections over time), or storage should be de-allocated away as more copies of the current task model trend towards dense interconnections over time or descend to a convergence rate of 0 prematurely.

According to example embodiments of the present disclosure, a computational metric of a copy of a current task model may be a learning slope of the copy of the current task model. Over multiple iterations of computation by a copy of a current task model, by optimization algorithms such as gradient descent, parameters of the copy of the current task model may, over time, approach a set of stable, nonzero values where differences between each iteration become negligible. Thus, a learning slope may describe a rate at which any copy of a current task model converges towards an end state over time during training, where the end state represents convergence of the copy of the current task model.

A learning slope may be quantified by derivatives (slopes) of a variety of other computational metrics measured over time. According to example embodiments of the present disclosure, a learning slope may be quantified by a slope of accuracy of a copy of the current task model over time. Accuracy may be measured by a degree to which a current task model's output for a labeled training dataset after an iteration of training matches the labels of the training dataset. According to example embodiments of the present disclosure, a learning slope may be quantified by a slope of loss of a copy of the current task model over time. Loss may be output of a cost function per iteration of the current task model as described above. According to example embodiments of the present disclosure, a learning slope may be quantified by a confusion matrix of a copy of the current task model over time. A confusion matrix may contain coefficients representing true positives, false positives, true negatives, and false negatives of the current task model's output per iteration. A learning slope may therefore describe change in one or more of these confusion matrix coefficients over time.

Upon convergence of parameters of a copy of the learning model, due to stability in values of the parameters over iterations of computing the machine learning task, fewer significant digits in floating-point arithmetic (such as floating-point multiplication operations) may be required to maintain accuracy of each iteration of the machine learning task, as converged weight values are less likely to fluctuate in magnitude resulting in more significant digits needed. Thus, upon convergence of parameters of a copy of the learning model, storage space allocated to the copy of the learning model may be reduced in terms of memory, and the computing system may reduce the number of significant digits involved in computing the machine learning task, decreasing precision of the floating-point arithmetic operations on the basis that convergence of parameter values increases confidence in accuracy.

Figure 3:
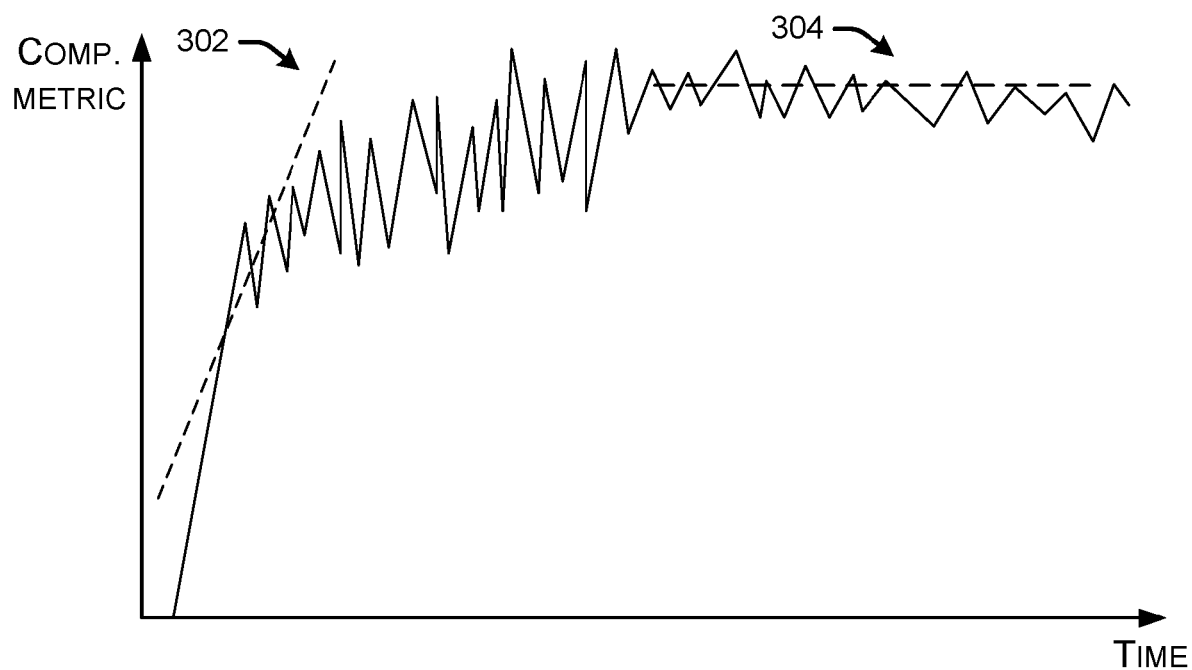
FIG. 3 illustrates an example of a learning slope of a copy of a task model over time.

FIG. 3 illustrates an example of a learning slope of a copy of a task model over time (where the x-axis is time, and the y-axis may be computational metrics as described above from which a learning slope derivative may be derived, without limitation thereto). Two derivatives, learning slopes 302 and 304, are approximately illustrated as broken lines. Herein, it may be observed that the learning slope 302 is initially steep as parameters of the copy of the task model are initially disparate among different units of the copy of the task model. As time advances, parameters are exchanged between units of the copy of the task model and new values are gradually learned for the parameters, which converge (at nonzero values). Convergence may be observed to occur where the learning slope 304 plateaus out.

At step 210, the computing system derives a predicted computational metric of the copy of the current task model based on the computational metric. According to example embodiments of the present disclosure, the computing system may input a computational metric of the copy of the current task model into a learning slope progression learning model. According to example embodiments of the present disclosure, learning slopes over time may be input into a learning slope progression learning model, which may be a second, separate learning model. The learning slope progression learning model may, in taking values of the learning slope over time as model inputs, learn trends describing the progression of the learning slope over time or fit trends to the progression of the learning slope over time by methods such as regression. Based on a trend learned or fit in such manners, the learning slope progression learning model may be executed by one or more processors to predict future learning slopes following the period for which learning slopes have been input, and thereby, may extrapolate and output predicted computational metrics of the current task model. Predicted computational metrics may include, for example, an expected completion time of the machine learning task being computed by the current task model, or expected distributions of computing workload and overhead between each copy of the current task model.

According to example embodiments of the present disclosure, a learning slope progression learning model may be any suitable computational model constituting computer-readable instructions stored on a computer-readable storage medium which is operative to learn a trend based on computational metrics of the current task model and, based thereon, extrapolate predicted computational metrics of the current task model. For example, the learning slope progression learning model may be a statistical model such as a regression model according to Bayesian or other statistical distributions. According to example embodiments of the present disclosure, a learning slope progression learning model may be a model incorporating recurrent neural network ("RNN") architectures such as long short-term memory ("LSTM") architectures, so as to enable the learning slope progression learning model to fit how earlier computational metrics may influence later computational metrics separated by spans of time. In general, thus, a learning slope progression learning model may, by extrapolating, predicting, fitting, modeling, or any other such suitable computation, derive predicted computational metrics of the current task model from known computational metrics of the current task model.

At step 212, the computing system, based on the computational metric trend, changes allocation of a computing resource for computing of the machine learning task by the current task model during runtime of the copy of the current task model. According to example embodiments of the present disclosure, based on a sparsity measure as a computational metric, in the event that the sparsity measure (such as an overall sparsity measure of a copy of a model) indicates that copies of the current task model trend towards sparsity over time, the computing system may determine that allocations of computing resources (such as cores, nodes, or clusters) to copies of the current task model should subsequently be decreased (but not greatly decreased) over time, as described above. In the event that the sparsity measure indicates that copies of the current task model do not trend towards sparsity over time, the computing system may determine that allocations of computing resources to copies of the current task model should subsequently not be decreased over time. In the event that the sparsity measure indicates that copies of the current task model trend towards density over time, the computing system may determine that allocations of computing resources to copies of the current task model should subsequently be increased over time.

According to example embodiments of the present disclosure, based on learning slopes as a computational metric, in the event that learning slopes indicate comparatively fast convergence over time (such as, for example, accuracy increasing comparatively promptly over time, loss decreasing comparatively promptly over time, or confusion matrices increasing in true positives and/or true negatives, and/or decreasing in false positives and/or false negatives, comparatively promptly over time), the computing system may determine that allocations of computing resources (such as cores, nodes, or clusters) to copies of the current task model should be decreased over time, and, furthermore, that storage space allocated to copies of the current task model should be decreased over time until the end of a current training epoch, and converged copies of the current task model should be deleted from storage in accordance, leaving only the trained parameters at the end of an iteration of training.

Moreover, those computing resources previously allocated according to step 202 with the expectation that allocations will be decreased over time may be allocated away from copies of the current task model comparatively earlier than those computing resources previously allocated with the expectation that allocations will be reserved over time.

In the event that learning slopes indicate comparatively slow convergence over time (such as, for example, accuracy increasing slowly or not increasing over time, loss decreasing slowly or not decreasing over time, or confusion matrices increasing in true positives and/or true negatives, and/or decreasing in false positives and/or false negatives, slowly or not doing so over time), the computing system may determine that allocations of computing resources (such as cores, nodes, or clusters) to copies of the current task model should not be decreased or should be increased over time, and, furthermore, that storage space allocated to copies of the current task model should not be decreased over time, as copies of the current task model are unlikely to have converged and thus should not be deleted from storage prior to the end of the epoch.

Moreover, those computing resources previously allocated to other tasks according to step 202 with the expectation that allocations will be decreased over time may be allocated to copies of the current task model, over those computing resources previously allocated to other tasks with the expectation that allocations will be reserved over time.

Thus, example embodiments of the present disclosure provide a method by which trends and predicted metrics of past machine learning tasks computed by similar task models may be used to predictively allocate computing resources to machine learning tasks of a current task model. Moreover, during runtime of copies of the current task model, computational metrics of computation of a machine learning task, quantified over time, may be used to derive computational metric trends and predicted computational metrics. Computational metrics over time may be referenced to re-allocate computing resources for computing the machine learning task by the copies of the current task model during runtime of the current task model.

Figure 4A:
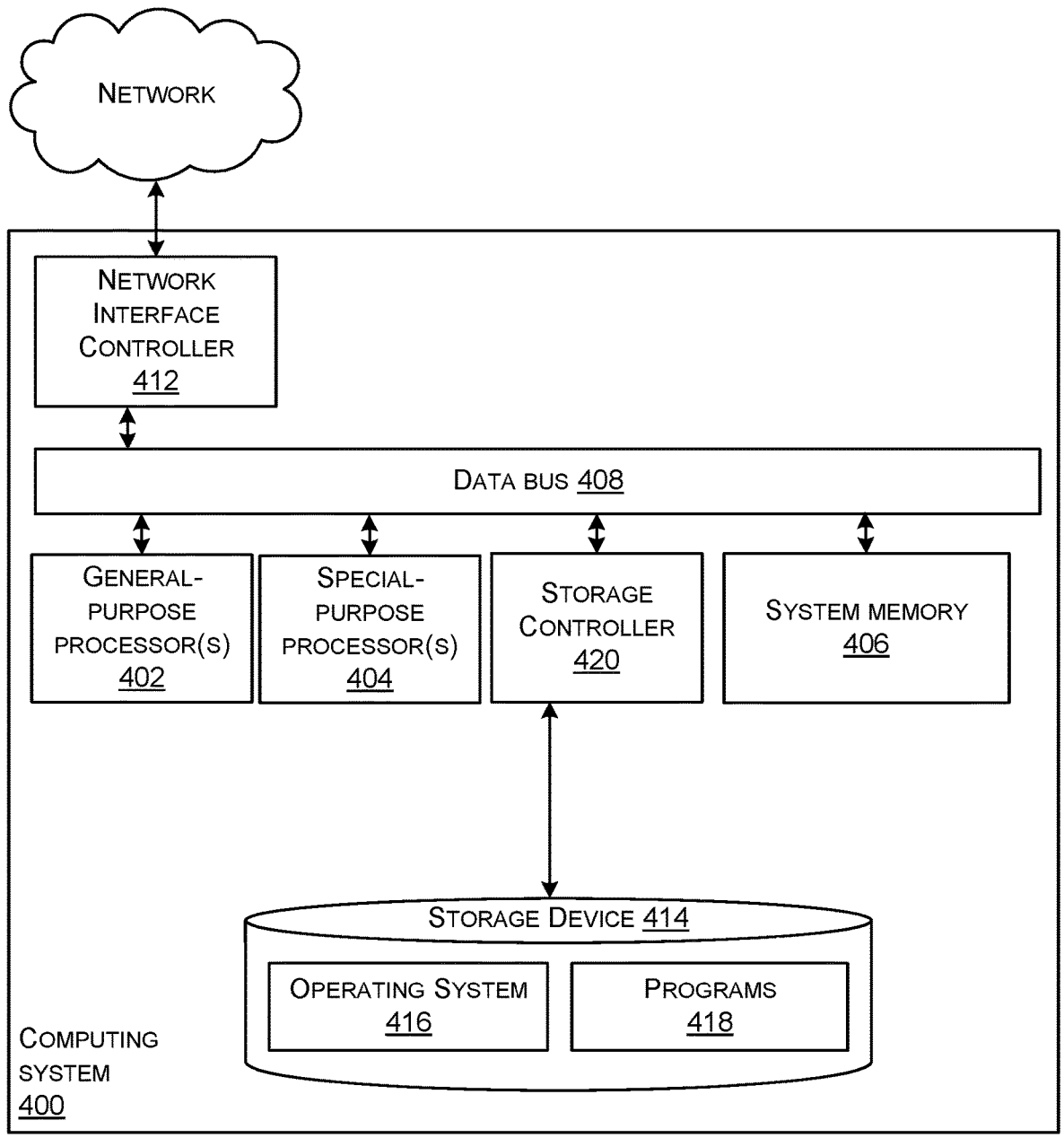
FIG. 4A illustrates an example system architecture of a computing system configured to compute machine learning tasks according to example embodiments of the present disclosure.

FIG. 4A illustrates an example system architecture of a computing system 400 configured to compute machine learning tasks according to example embodiments of the present disclosure.

According to example embodiments of the present disclosure, a computing system 400 may include any number of general-purpose processor(s) 402 and any number of special-purpose processor(s) 404. The general-purpose processor(s) 402 and special-purpose processor(s) 404 may be physical processors and/or may be virtual processors, and may include any number of physical and/or virtual cores and be distributed amongst any number of physical and/or virtual nodes and any number of physical and/or virtual clusters. The general-purpose processor(s) 402 and special-purpose processor(s) 404 may each be configured to execute one or more instructions stored on a computer-readable storage medium, such as models as described above, to cause the general-purpose processor(s) 402 or special-purpose processor(s) 404 to compute tasks such as machine learning tasks. Special-purpose processor(s) 404 may be computing devices having hardware or software facilitating computation of machine learning tasks such as training and inference computations. For example, special-purpose processor(s) 404 may be accelerator(s), such as GPUs as described above, and/or the like. To facilitate computation of tasks such as training and inference, special-purpose processor(s) 404 may, for example, implement engines operative to compute mathematical operations such as matrix arithmetic.

The general-purpose processor(s) 402 and special-purpose processor(s) 404 may perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

A computing system 400 may further include a system memory communicatively coupled to the general-purpose processor(s) 402 and the special-purpose processor(s) 404 by a data bus 408 as described above. The system memory 406 may be physical or may be virtual, and may be distributed amongst any number of nodes and/or clusters. The system memory 406 may be volatile, such as RAM, non-volatile, such as ROM, flash memory, miniature hard drive, memory card, and the like, or some combination thereof.

The data bus 408 provides an interface between the general-purpose processor(s) 402, the special-purpose processor(s) 404, and the remainder of the components and devices of the computing system 400. The data bus 408 may provide an interface to a RAM, used as the main memory in the computing system 400. The data bus 408 may further provide an interface to a computer-readable storage medium such as a read-only memory ("ROM") or non-volatile RAM ("NVRAM") for storing basic routines that help to startup the computing system 400 and to transfer information between the various components and devices. The ROM or NVRAM may also store other software components necessary for the operation of the computing system 400 in accordance with the configurations described herein.

The computing system 400 may operate in a networked environment using logical connections to remote computing devices and computer systems through a network. The data bus 408 may include functionality for providing network connectivity through a NIC 412, such as a gigabit Ethernet adapter. The NIC 412 is capable of connecting the computing system 400 to other computing devices over a network. It should be appreciated that multiple NICs 412 may be present in the computing system 400, connecting the computing system 400 to other types of networks and remote computer systems.

The computing system 400 may be connected to a storage device 414 that provides non-volatile storage for the computing system 400. The storage device 414 may store an operating system 416, programs 418, a BIOS, and data, which have been described in greater detail herein. The storage device 414 may be connected to the computing system 400 through a storage controller 420 connected to the data bus 408. The storage device 414 may consist of one or more physical storage units. The storage controller 420 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing system 400 may store data on the storage device 414 by transforming the physical state of the physical storage units to reflect the information being stored. The specific transformation of physical state may depend on various factors, in different embodiments of this description. Examples of such factors may include, but are not limited to, the technology used to implement the physical storage units, whether the storage device 414 is characterized as primary or secondary storage, and the like.

For example, the computing system 400 may store information to the storage device 414 by issuing instructions through the storage controller 420 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing system 400 may further read information from the storage device 414 by detecting the physical states or characteristics of one or more particular locations within the physical storage units.

In addition to the storage device 414 described above, the computing system 400 may have access to other computer-readable storage media to store and retrieve information, such as program modules, data structures, or other data. It should be appreciated by those skilled in the art that computer-readable storage media is any available media that provides for the non-transitory storage of data and that may be accessed by the computing system 400. In some examples, the operations performed by a router node of the network overlay, and or any components included therein, may be supported by one or more devices similar to the computing system 400. Stated otherwise, some or all of the operations performed for computing machine learning tasks may be performed by one or more computing systems 400 operating in a networked, distributed arrangement over one or more logical fabric planes over one or more networks, as described in further detail subsequently with reference to FIG. 5.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 414 may store an operating system 416 utilized to control the operation of the computing system 400. According to one embodiment, the operating system comprises the LINUX operating system and derivatives thereof. According to another embodiment, the operating system comprises the WINDOWS operating system from MICROSOFT CORPORATION of Redmond, Wash. It should be appreciated that other operating systems may also be utilized. The storage device 414 may store other system or application programs and data utilized by the computing system 400.

In one embodiment, the storage device 414 or other computer-readable storage media is encoded with computer-executable instructions which, when loaded into a computer, transform the computer from a general-purpose computing system into a special-purpose computer capable of implementing the embodiments described herein. These computer-executable instructions transform the computing system 400 by specifying how the general-purpose processor(s) 402 and special-purpose processor(s) 404 transition between states, as described above. According to one embodiment, the computing system 400 has access to computer-readable storage media storing computer-executable instructions which, when executed by the computing system 400, perform the various processes described above with regard to FIGS. 1-3. The computing system 400 may also include computer-readable storage media having instructions stored thereupon for performing any of the other computer-implemented operations described herein.

Figure 4B:
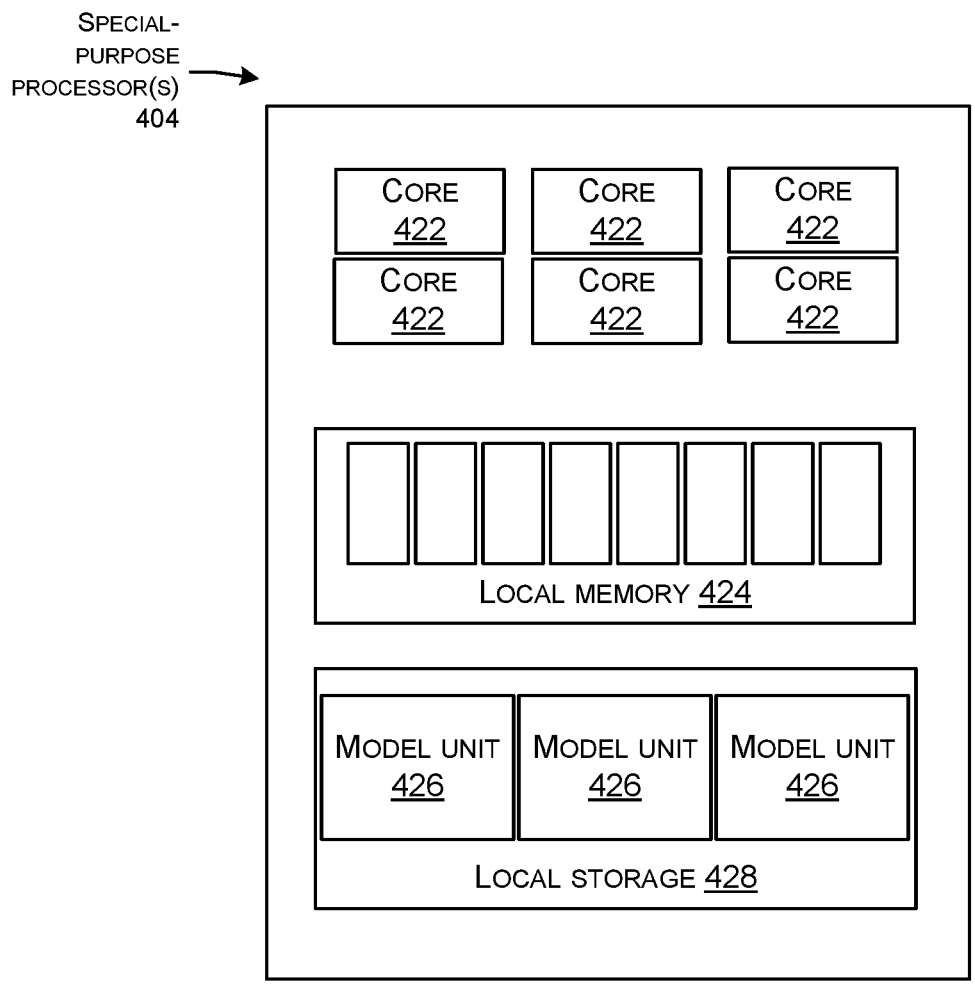
FIG. 4B illustrates an example of special-purpose processor(s) according to example embodiments of the present disclosure.

FIG. 4B illustrates an example of special-purpose processor(s) 404 according to example embodiments of the present disclosure. The special-purpose processor(s) 404 may include any number of core(s) 422. Processing power of the special-purpose processor(s) 404 may be distributed among the core(s) 422. Each core 422 may include local memory 424, which may contain initialized data, such as parameters and hyperparameters, for the performance of computing machine learning tasks. Each core 422 may further be configured to execute one or more sets of model units 426 initialized on local storage 428 of the core 422, which may each be executable by the core(s) 422, including concurrent execution by multiple core(s) 422, to perform, for example, arithmetic operations such as matrix arithmetic and the like for the purpose of machine learning tasks.

Figure 5:
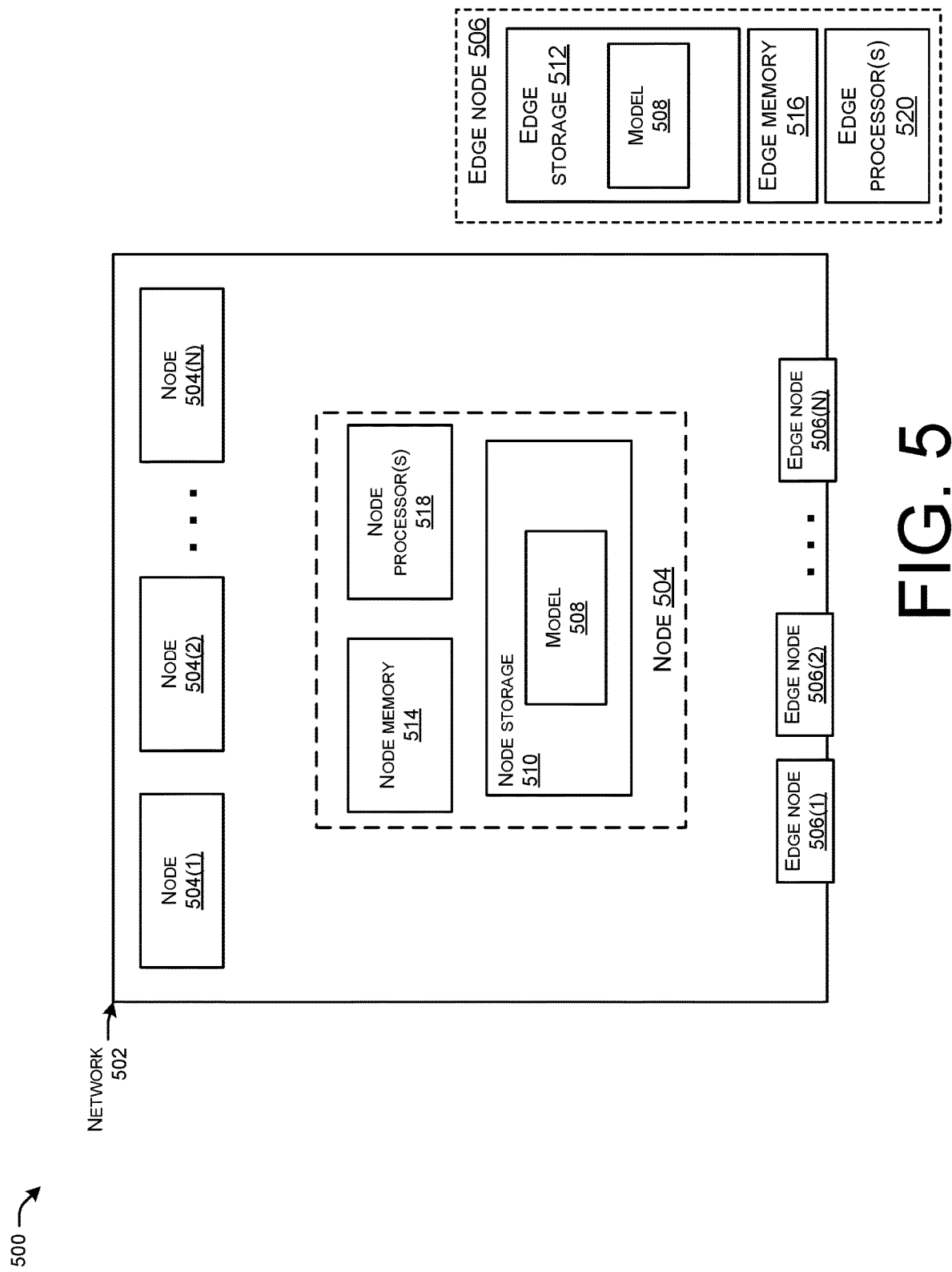
FIG. 5 illustrates an architectural diagram of a massive computing system hosting computing resources and models according to example embodiments of the present disclosure.

FIG. 5 illustrates an architectural diagram of a massive computing system 500 hosting computing resources and models according to example embodiments of the present disclosure. Possible architectural embodiments for hosting computing resources as described above are illustrated herein.

The massive computing system 500 may be implemented over a network 502 of physical or virtual nodes 504(1), 504(2), . . . , 504(N) (where any unspecified node may be referred to as a node 504) connected by physical or virtual network connections. The network 502 may further terminate at physical or virtual edge nodes 506(1), 506(2), . . . , 506(N) (where any unspecified edge node may be referred to as an edge node 506) located at physical and/or logical edges of the network 502.

A model 508 as described in example embodiments of the present disclosure may have units distributed on any number of nodes 504 and edge nodes 506, where the units may be stored on physical or virtual storage of any number of nodes 504 ("node storage 510") and/or physical or virtual storage of any number of edge nodes 506 ("edge storage 512"), and may be loaded into physical or virtual memory of the any number of nodes 504 ("node memory 514") and/or physical or virtual memory of the any number of edge nodes 506 ("edge memory 516") in order for any number of physical or virtual processor(s) of the any number of nodes 504 ("node processor(s) 518") and/or any number of physical or virtual processor(s) of the any number of edge nodes 506 ("edge processor(s) 520") to perform computations by executing units of the model 508 to compute machine learning tasks as described herein. Node processor(s) 518 and edge processor(s) 520 may be may be standard programmable processors that perform arithmetic and logical operations necessary for computations, and may be special-purpose computing devices facilitating computation of machine learning tasks, such as any number of special-purpose processor(s) 404 as described above, including accelerator(s) such as GPUs and the like.

According to example embodiments of the present disclosure, steps of the method 200 as described above may be distributed among node processor(s) 518 and/or edge processor(s) 520 by transporting data between nodes 504 and edge nodes 506 as needed; generally, computing of machine learning tasks may be distributed to nodes 504, where the bulk of computing power found at special-purpose processor(s) 404 may be focused. Allocation of computing resources may thus generally be performed at nodes 504, wherein most of the computation for the machine learning tasks may generally take place. To some extent, quantification of computational metrics and determination of computational metric trends may be distributed to edge nodes 506, which may generally have comparatively less computing power and may possess primarily general-purpose processor(s) 402 over special-purpose processor(s) 404. Deriving predicted computational metrics may generally be distributed to nodes 504, as greater computing power is generally required for executing learning slope progression learning models.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing computer-executable instructions that, when executed by the one or more processors, cause the one or more processors to:
compute a machine learning task by executing an additional copy of a current task model, wherein parameters of the additional copy of the current task model are learned through training of the additional copy of the current task model;
quantify a computational metric of the copy of the current task model during runtime of the additional copy of the current task model; and
change allocation of a computing resource for computing of the machine learning task by the current task model during runtime of the additional copy of the current task model.

2. The system of claim 1, wherein the computational metric comprises a sparsity measure.

3. The system of claim 1, wherein the computational metric comprises a learning slope.

4. The system of claim 1, wherein the instructions further cause the one or more processors to determine a computational metric trend based on the computational metric.

5. The system of claim 1, wherein the instructions further cause the one or more processors to derive a predicted computational metric of the additional copy of the current task model based on the computational metric.

6. The system of claim 5, wherein deriving a predicted computational metric based on the computational metric comprises inputting the computational metric into a learning slope progression learning model.

7. The system of claim 1, wherein the instructions further cause the one or more processors to, based on at least one of a computational metric trend and a predicted computational metric of a past task model, allocate a computing resource for computing of the machine learning task by the current task model prior to runtime of the current task model.

8. A method comprising:
computing, by a computing system, a machine learning task by executing an additional copy of a current task model, wherein parameters of the additional copy of the current task model are learned through training of the additional copy of the current task model;
quantifying, by the computing system, a computational metric of the additional copy of the current task model during runtime of the additional copy of the current task model; and
changing, by the computing system, allocation of a computing resource for computing of the machine learning task by the current task model during runtime of the additional copy of the current task model.

9. The method of claim 8, wherein the computational metric comprises a sparsity measure.

10. The method of claim 8, wherein the computational metric comprises a learning slope.

11. The method of claim 8, further comprising determining, by the computing system, a computational metric trend based on the computational metric.

12. The method of claim 8, further comprising deriving, by the computing system, a predicted computational metric of the additional copy of the current task model based on the computational metric.

13. The method of claim 12, wherein deriving a predicted computational metric based on the computational metric comprises inputting, by the computing system, the computational metric into a learning slope progression learning model.

14. The method of claim 8, further comprising the computing system, based on at least one of a computational metric trend and a predicted computational metric of a past task model, allocating a computing resource for computing of the machine learning task by the current task model prior to runtime of the current task model.

15. A massive computing system comprising:
a plurality of nodes and a plurality of edge nodes, each of the plurality of nodes and plurality of edge nodes comprising:
one or more processors; and
one or more non-transitory computer-readable media storing computer-executable instructions; that, when executed by the one or more processors, cause the one or more processors to:
compute a machine learning task by executing an additional copy of a current task model, wherein parameters of the additional copy of the current task model are learned through training of the additional copy of the current task model;
quantify a computational metric of the additional copy of the current task model during runtime of the additional copy of the current task model; and
change allocation of a computing resource for computing of the machine learning task by the current task model during runtime of the additional copy of the current task model.

16. The massive computing system of claim 15, wherein the computational metric comprises a sparsity measure.

17. The massive computing system of claim 15, wherein the computational metric comprises a learning slope.

18. The massive computing system of claim 15, wherein the instructions further cause the one or more processors to determine a computational metric trend based on the computational metric.

19. The massive computing system of claim 15, wherein the instructions further cause the one or more processors to derive a predicted computational metric of the additional copy of the current task model based on the computational metric.

20. The massive computing system of claim 19, wherein deriving a predicted computational metric based on the computational metric comprises inputting the computational metric into a learning slope progression learning model.

* * * * *